(12) United States Patent
Heidenfeldt et al.

(10) Patent No.: US 11,785,101 B1
(45) Date of Patent: Oct. 10, 2023

(54) ALLOWANCE OF APPLICATION COMMUNICATION BASED ON CONTEXT

(71) Applicant: Lenovo (Singapore) Pte. Ltd., Singapore (SG)

(72) Inventors: Mark Christopher Heidenfeldt, Morrisville, NC (US); Mark K. Summerville, Apex, NC (US); Justin Michael Ringuette, Morrisville, NC (US); Sandy Collins, Durham, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 0 days.

(21) Appl. No.: 17/707,229

(22) Filed: Mar. 29, 2022

(51) Int. Cl.
*H04L 67/51* (2022.01)
*H04L 67/52* (2022.01)
*H04L 67/101* (2022.01)
*H04L 67/10* (2022.01)
*H04L 67/143* (2022.01)
*H04L 67/14* (2022.01)
*H04L 67/148* (2022.01)
*H04L 67/146* (2022.01)

(52) U.S. Cl.
CPC .............. *H04L 67/51* (2022.05); *H04L 67/10* (2013.01); *H04L 67/101* (2013.01); *H04L 67/14* (2013.01); *H04L 67/143* (2013.01); *H04L 67/146* (2013.01); *H04L 67/148* (2013.01); *H04L 67/52* (2022.05)

(58) Field of Classification Search
CPC .......... H04L 67/51; H04L 67/52; H04L 67/14
See application file for complete search history.

(56) References Cited

U.S. PATENT DOCUMENTS

| 9,191,989 | B2 | 11/2015 | Valine | |
| 10,771,619 | B1* | 9/2020 | Puvvula | H04M 1/72454 |
| 2021/0243309 | A1* | 8/2021 | Stepnioski | H04L 12/1435 |

* cited by examiner

*Primary Examiner* — Suraj M Joshi
(74) *Attorney, Agent, or Firm* — John M. Rogitz; John L. Rogitz

(57) ABSTRACT

In one aspect, a first device may include at least one processor and storage accessible to the at least one processor. The storage may include instructions executable by the at least one processor to identify a context associated with the first device and identify a first group of applications associated with the context. While the context is ongoing, the instructions may be executable to allow the first group of applications to communicate with one or more other devices besides the first device and to disallow a second group of applications from communicating with one or more other devices besides the first device.

20 Claims, 5 Drawing Sheets

ALLOWANCE OF APPLICATION COMMUNICATION BASED ON CONTEXT

FIELD

The disclosure below relates to technically inventive, non-routine solutions that are necessarily rooted in computer technology and that produce concrete technical improvements. In particular, the disclosure below relates to techniques for allowing applications to communicate based on context.

BACKGROUND

As recognized herein, cellular communication is ever-increasing in use, particularly with the advent of 5G communications. However, as also recognized herein, most cellular communication devices allow all applications to communicate with other devices unbeknownst to the user unless communication is turned off on a global level for that device. But disabling all apps from communicating is not desirable in the least and demonstrates some of the technical shortcomings of these types of devices since the device may lose use of certain functions or be unable to execute certain tasks. And if application communication remains enabled on a global level, a user may hit their monthly cellular data consumption limit quickly and unnecessarily, the user may have their cellular data provider throttle back their data consumption involuntarily, and/or the user's device may consume an undue amount of bandwidth that the cellular service provider could allocate to more effective use elsewhere. There are currently no adequate solutions to the foregoing computer-related, technological problems.

SUMMARY

Accordingly, in one aspect a first device includes at least one processor and storage accessible to the at least one processor. The storage includes instructions executable by the at least one processor to identify a context associated with the first device and identify a first group of applications associated with the context. The instructions are also executable to, while the context is ongoing, allow the first group of applications to communicate with one or more other devices besides the first device and disallow a second group of applications from communicating with one or more other devices.

In some examples, the second group of applications may include all end-user-installed applications stored at the first device that are not included in the first group of applications. Also in some examples, the first group of applications may have been preselected by an end-user for the identified context. Additionally or alternatively, in some examples the first group of applications may be autonomously determined by the first device based on the context.

In various example implementations, the context may be identified based on location data accessible to the first device, based on a current time of day, based on input from one or more inertial sensors, and/or based on electronic calendar data accessible to the first device. Additionally or alternatively, the context may be identified as one or more of a business context and a personal context. The context may also be identified based on end-user input indicating the context. The context may be further identified as the first device being within a threshold of a data consumption limit for a particular period of time.

In one example implementation, the context may be related to physical exercise and the first group of applications may include a fitness tracker application, a music streaming application, and/or a workout video application. Also according to this implementation, the second group of applications may include an email application and/or a short message service text message application.

Still further, if desired, in some example embodiments the first device may include a wireless communication transceiver accessible to the at least one processor. The first device may use the wireless communication transceiver to allow the first group of applications to communicate with the one or more other devices besides the first device.

In another aspect, a method includes identifying a context associated with a first device and identifying a first group of applications associated with the context. The method also includes, while the context is ongoing, using the first device to permit the first group of applications to communicate with one or more other devices besides the first device and disallowing a second group of applications from communicating with one or more other devices.

Thus, in certain examples the method may include identifying, using the first device, at least a first application for inclusion in the first group of applications based on at least one tag for the first application. The at least one tag may include at least one context tag indicating at least one context associated with the first application.

Additionally, in some examples the method may include identifying the context associated with the first device based on receipt of user input at the first device, where the user input may indicate the context.

In still another aspect, at least one computer readable storage medium (CRSM) that is not a transitory signal includes instructions executable by at least one processor to access first data and identify, at a first device and based on the first data, a first group of applications that is allowed to transmit second data to one or more other devices. Based on identification of the first group of applications, the instructions are executable to allow the first group of applications to transmit the second data to one or more other devices and disallow at least one other application not in the first group from transmitting third data to one or more other devices.

In various examples, the first data may include data from an inertial sensor, data from an electronic calendar, data from a global positioning system (GPS) transceiver, and/or data from a wireless cellular transceiver.

Also, in some example embodiments the instructions may be executable to identify the other application to disallow the transmission of the third data based on the other application consuming at least a threshold amount of data within a threshold period of time.

The details of present principles, both as to their structure and operation, can best be understood in reference to the accompanying drawings, in which like reference numerals refer to like parts, and in which:

DETAILED DESCRIPTION

Figure 1:
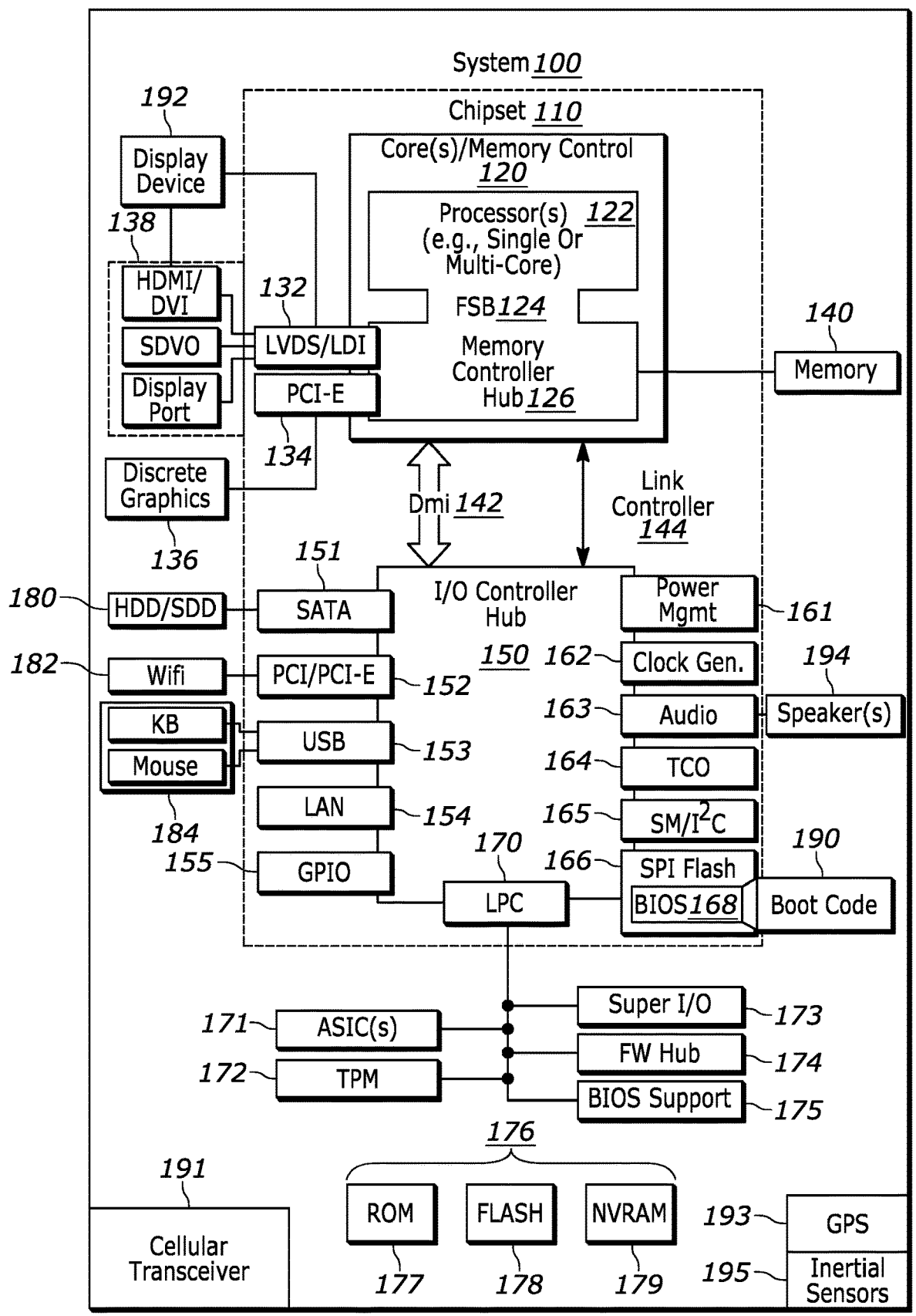
FIG. 1 is a block diagram of an example system consistent with present principles.

Among other things, the detailed description below discusses creation of a mode on mobile and other devices that allows for context-sensitive data use and that can become a saved configuration and enabled/disabled repeatedly. Such a filter mode may disable data usage for any application that is not in an approved list while the filter mode is enabled.

Thus, for the user, this filter mode allows an opportunity to disable unwanted applications, such as work applications, when the user is not in the office or when the applications are otherwise not needed by the user (e.g., creating a better separation of work and personal time through a shared or mixed-use device) to thus allow for interruption-free situations based on user preference or autonomous device determinations. For the device, this filter mode allows the blocking of data use from some or all apps save for a subset of applications permitted during that context, improving device performance by consuming less RAM and processor resources while also limiting data usage toward a monthly cellular data limit and also increasing battery life by reducing wireless electronic communications where possible.

Consider an example situation where a user creates a filter mode for exercise. The user would then be able to disable data use/communication by every application other their music streaming service of choice, their workout video application, and their fitness tracker application.

Another example would be for a user to create a driving mode where everything outside of a navigation or maps application is blocked from communicating with outside devices.

As yet another example, all apps not launched within a threshold amount of time of a given context beginning (e.g., within ten minutes) may be disallowed from communicating with other devices while that context continues to exist and also during the same context in the future.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any single- or multi-chip processor that can execute logic by means of various lines such as address lines, data lines, and control lines and registers and shift registers. Moreover, any logical blocks, modules, and circuits described herein can be implemented or performed with a system processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library. Also, the user interfaces (UI)/graphical UIs described herein may be consolidated and/or expanded, and UI elements may be mixed and matched between UIs.

Logic when implemented in software, can be written in an appropriate language such as but not limited to hypertext markup language (HTML)-5, Java®/JavaScript, C# or C++, and can be stored on or transmitted from a computer-readable storage medium such as a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode (LED) display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more universal serial bus (USB) interfaces 153, a local area network (LAN) interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

As also shown in FIG. 1, the system 100 may include a wireless cellular communications transceiver 191 for communicating over one or more cellular networks, including 4G and 5G cellular networks with Internet service such as those operated by cellular service providers Verizon® or T-Mobile®. Additionally or alternatively, the transceiver 191 may be a Wi-Fi transceiver, ultra-wideband (UWB) transceiver, Bluetooth transceiver, or other wireless communications transceiver that one or more applications ("apps") might use to communicate with other devices consistent with present principles.

FIG. 1 also shows that the system 100 may include a global positioning system (GPS) transceiver 193 that is configured to communicate with at least one satellite to receive/identify geographic position information and provide the geographic position information to the processor 122. However, it is to be understood that another suitable position receiver other than a GPS receiver may also be used in accordance with present principles to determine the location of the system 100.

The system 100 may further include one or more inertial sensors 195 such as a gyroscope that senses and/or measures the orientation of the system 100 and provides related input to the processor 122, a magnetometer that senses and/or measures directional movement of the system 100 and provides related input to the processor 122, and an accelerometer that senses acceleration and/or movement of the system 100 and provides related input to the processor 122.

Additionally, though not shown, the system 100 may include an audio receiver/microphone that provides input from the microphone to the processor 122 based on audio that is detected, such as via a user providing audible input to the microphone. The system 100 may also include a camera that gathers one or more images and provides the images and related input to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather still images and/or video.

It is to be understood that an example client device or other machine/computer may include fewer or more features than shown on the system 100 of FIG. 1. In any case, it is to be understood at least based on the foregoing that the system 100 is configured to undertake present principles.

Figure 2:
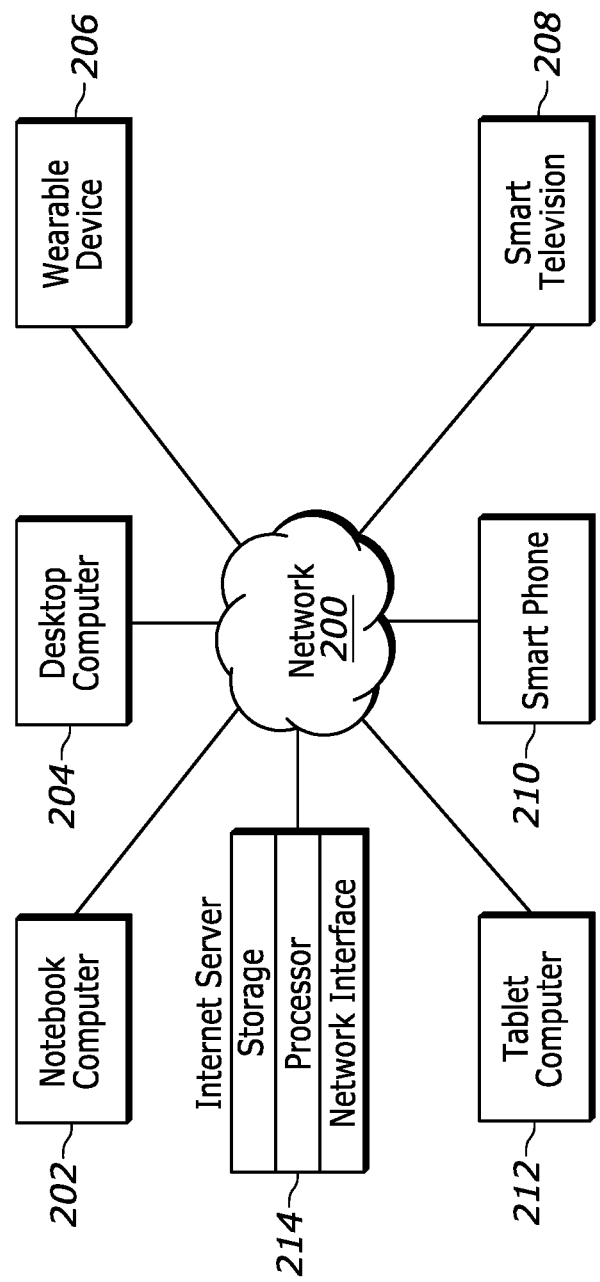
FIG. 2 is a block diagram of an example network of devices consistent with present principles.

Turning now to FIG. 2, example devices are shown communicating over a network 200 such as a 5G cellular network and/or the Internet consistent with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 may be configured to communicate with each other over the network 200 to undertake present principles.

Figure 3:
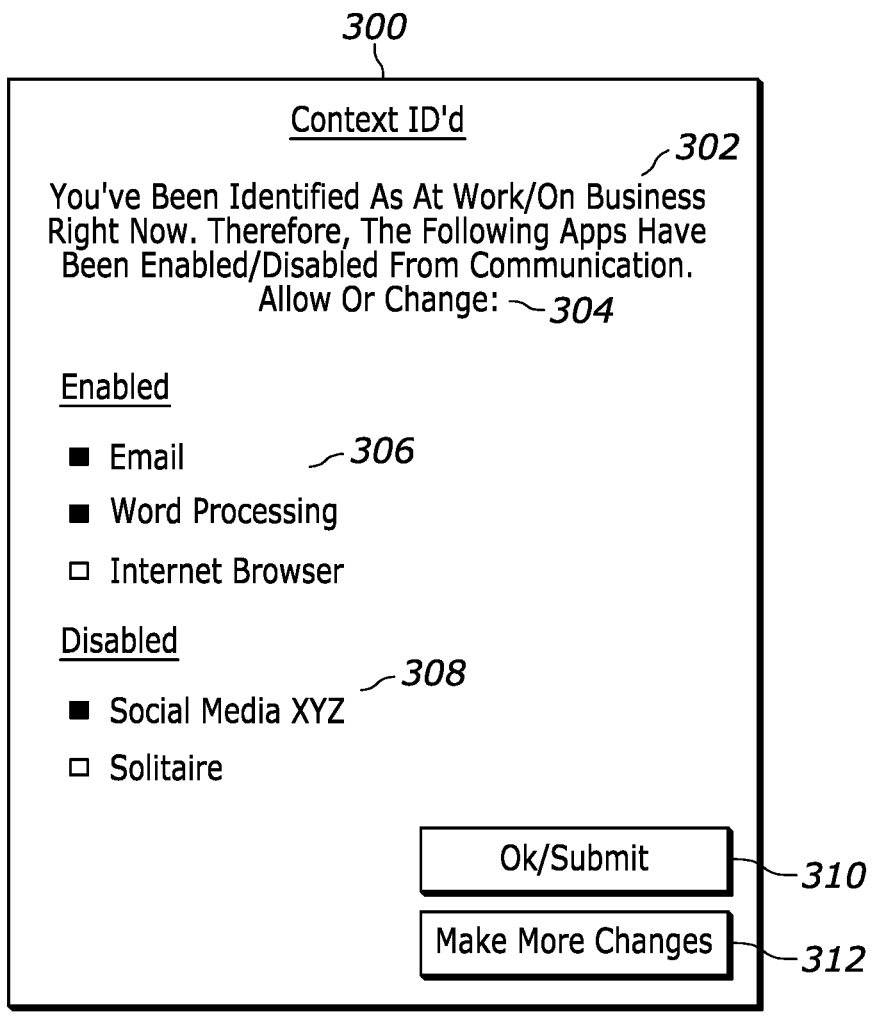
FIG. 3 shows an example graphical user interface (GUI) that may be presented responsive to a device autonomously identifying a particular context as ongoing consistent with present principles.

Turning now to FIG. 3, suppose an end-user's client device has accessed one or more types of data and identified a particular context as occurring based on the data. In various examples, the client device may be a smartphone, tablet computer, laptop computer, desktop computer, wearable device such as a smart watch or smart glasses/headset, etc. Responsive to identifying the context, the client device may present on its display a graphical user interface (GUI) 300 as shown in FIG. 3.

Accordingly, as may be appreciated from FIG. 3, the GUI 300 may include a text indication 302 that a context of being currently at work/on business has been autonomously identified by the device. The GUI 300 may also include a prompt 304 to allow a first group of applications (apps) autonomously determined by the client device based on the identified context to communicate wirelessly with other devices. The prompt 304 may also indicate to the end-user that the first group of apps allowed to communicate with other apps can be changed, as can an autonomously-determined second group of apps for which communication is to be specifically disallowed while the context is ongoing.

Disallowing app communication may include, for example, disabling or blocking outbound communication commands from the app from being executed by a processor in the client device (like its CPU or a processor in the device's wireless transceiver itself), where the processor might otherwise use the device's wireless communications transceiver antenna to transmit communications to other devices in conformance with the commands (e.g., such as a traveling app providing location data back to a server operated by the app's developer). For inbound communications, disallowing app communication may include blocking or declining to provide incoming communications to the app itself for processing.

Still in reference to FIG. 3, as also shown the GUI 300 may include respective options 306 that are respectively selectable by checking the check box adjacent to each option 306 to select or deselect one or more apps for inclusion in the first group of apps. Note that any or all end-user-installed apps may be listed as a respective option 306, or up to a threshold number of the most-used/executed apps may be listed.

The GUI 300 may also include respective options 308 that are respectively selectable by checking the check box adjacent to each option 308 to select or deselect one or more apps for inclusion in the second group of apps (apps for which communication is disallowed). Note that any or all end-user-installed apps may be listed as a respective option 308, or up to a threshold number of the most-used/executed apps may be listed.

Then once the end-user has made selections from amongst the options 306, 308, or if the end-user decides to just accept the autonomously-determined app groupings, the user may select the ok/submit selector 310 using touch input, cursor input, etc. to save the app selections or groupings for the context in a dedicated profile for that context (and/or in other local or remote storage). However, if the end-user would like to make additional changes to the first and second app groupings beyond what can be made via the GUI 300, the end-user may select the selector 312 to command another GUI be presented on the client device's display, such as the GUI 500 of FIG. 5 or GUI 800 of FIG. 8 as will be described later.

Figure 4:
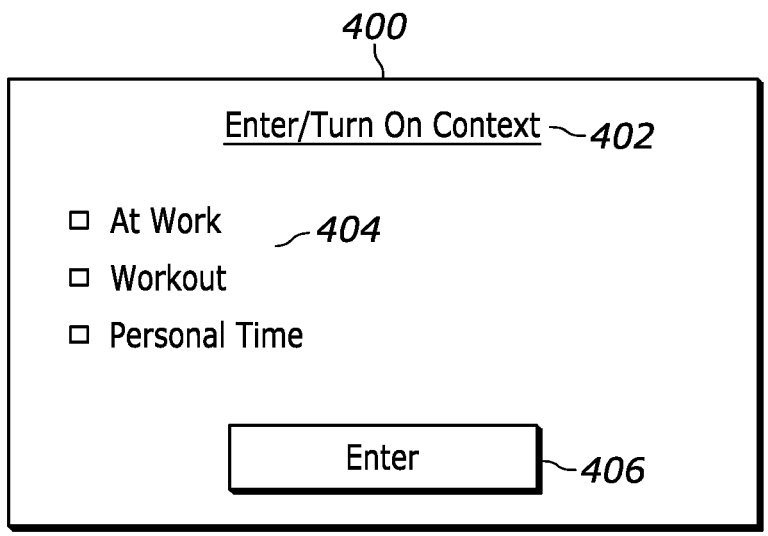
FIG. 4 shows an example GUI that may be presented for an end-user to indicate a particular context consistent with present principles.

However, first reference is made to FIG. 4. This figure shows another example GUI 400 that may be presented on the display of the end-user's client device responsive to a user command such as a voice command, touch input navigating a settings menu of a guest operating system to reach the GUI 400, launch or browsing of a dedicated communication management application from a home screen of the client device, etc.

It is to be understood according to this example implementation that the end-user's client device may identify a given context for app communication based on input from the end-user themselves that indicates the context (in addition to or in lieu of the device autonomously identifying one or more current contexts). Accordingly, the GUI 400 may include a prompt 402 prompting the end-user to select a context to apply. One or more of the options 404 may then be selected for the end-user to indicate a current context(s) for which associated app communication should be enabled or disabled. In the present instance, the example contexts include an "at work" or business context, a workout or physical exercise context, and a personal time context. However, note that any available contexts and/or any contexts already defined by the end-user may be listed as a respective option 404.

Then once the end-user has selected a respective check box for one or more of the respective options 404, the user may select the enter selector 406 for the client device to then operate in accordance with the selected context(s), thus allowing certain apps associated with the context to communicate with other devices and disallowing certain other apps from communicating with other devices while the context is occurring/selected.

Figure 5:
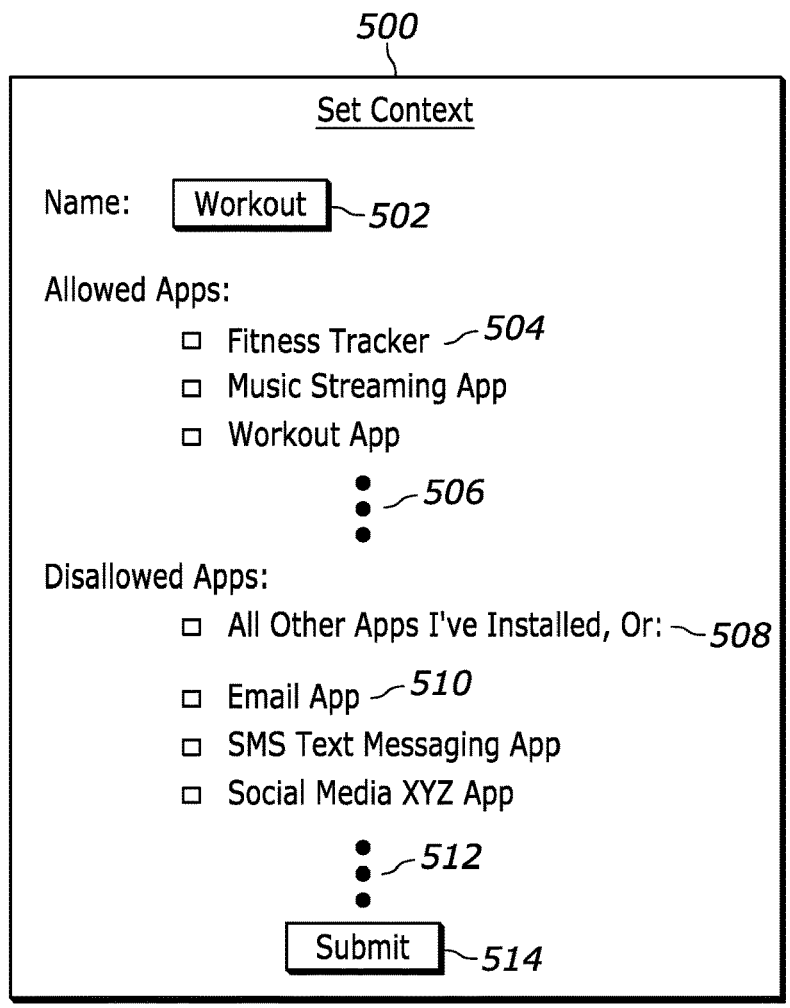
FIG. 5 shows an example GUI through which a context profile may be created and through which apps may be assigned for communication or non-communication during the associated context consistent with present principles.

Continuing the detailed description in reference to FIG. 5, it shows an example GUI 500 that may be presented on the display of the end-user's client device to define, establish, or edit a context for which various app communications should be allowed or disallowed. The GUI 500 may be reached by navigating a settings menu for the device or its guest operating system, based on selection of the selector 312 as described above, etc. However, note here that although the GUI 500 may be reached by selecting the selector 312 of FIG. 3, a different example context will be discussed in relation to FIG. 5 than was shown in FIG. 3. But nonetheless note that should the selector 312 be selected from the GUI 300, then the GUI 500 would be populated with entries corresponding to that context instead.

In any case, in the present example a context name of "workout" has been entered into input box 502 using a hard or soft keyboard. The GUI 500 may also include one or more respective options 504 that are respectively selectable to select or deselect a given app for inclusion in a first group of apps that will be allowed to communicate with outside devices while the relevant context is entered or autonomously identified as occurring. Note that any or all end-user-installed apps may be listed as a respective option 504, or up to a threshold number of the most-used/executed apps may be listed with ellipses 506 being selectable to command the client device to present additional apps for selection via additional respective options 504.

As also shown in FIG. 5, the GUI 500 may also an option 508 that may be selectable to include, in a second group of apps that will be disallowed from communicating with outside devices while the relevant context is entered or identified as occurring, all other end-user-installed applications stored at the client device that are not already included in the first group of apps. Thus, all other apps a user might download and install from an app store may have communication disabled during the relevant context based on selection of option 508 while system apps, cellular network apps, operating system-level apps, etc. are still able to communicate for device updates, emergency alerts, etc.

Or if the user wished to select specific apps to include in the second group of apps rather than selecting all other user-installed apps via option 508, the user may instead select one or more respective options 510. Each option 510 may thus be selectable to select or deselect a given app for inclusion in the second group of apps. Note that any or all end-user-installed apps may be listed as a respective option 510, or up to a threshold number of the most-used/executed apps may be listed with ellipses 512 being selectable to command the client device to present additional apps for selection via additional respective options 510.

Then once the end-user has made selections from amongst the options 504, 508, and 510, the user may select the submit selector 514 to save the selections for the relevant context as a dedicated profile for that context (and/or otherwise save the selections in other local or remote storage).

Figure 6:
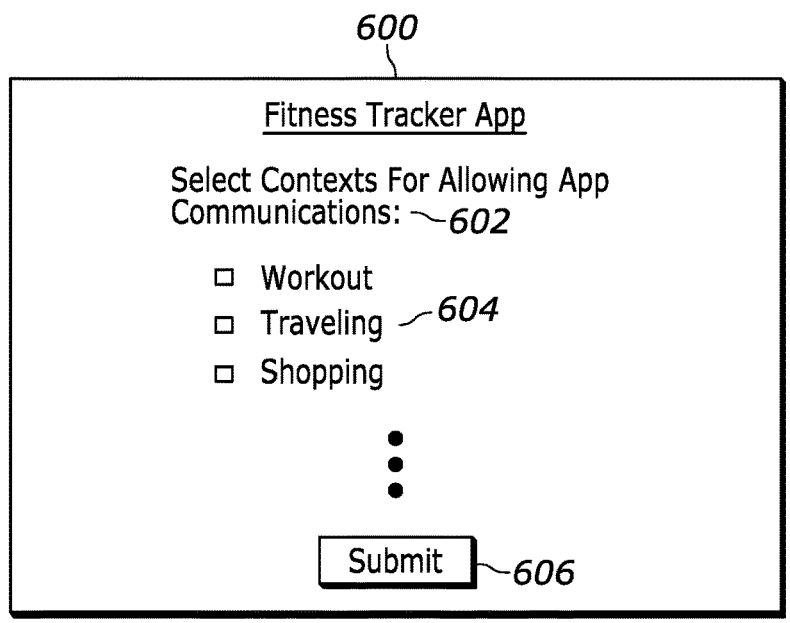
FIG. 6 shows an example GUI of a particular app through which one or more contexts may be assigned during which that app is allowed to communicate consistent with present principles.

FIG. 6 shows another example GUI 600 consistent with present principles. FIG. 6 demonstrates that app communication or non-communication for one or more contexts may be selected from within an app menu for a given software app as well. For example, for a fitness tracker app, the app may be launched by selecting an icon on the client device's home screen or app menu to then present an app screen for the fitness tracker app at which a settings selector may be selected to present the GUI 600.

Then, as shown in FIG. 6, the GUI 600 may prompt the end-user through a text prompt 602 to select one or more contexts for which the fitness tracker app should be allowed to communicate with outside devices, such as other nearby client devices and/or remotely-located servers. The end-user may then select a respective option 604 for any available context and/or context defined by the end-user, and then select the submit selector 606 to save the user's selections to one or more different context profiles (or other stored data). Additionally or alternatively, based on selection of the selector 606, the user's selections may be saved within the fitness tracker's own app settings for allowing or disallowing communication for a given context.

Figure 7:
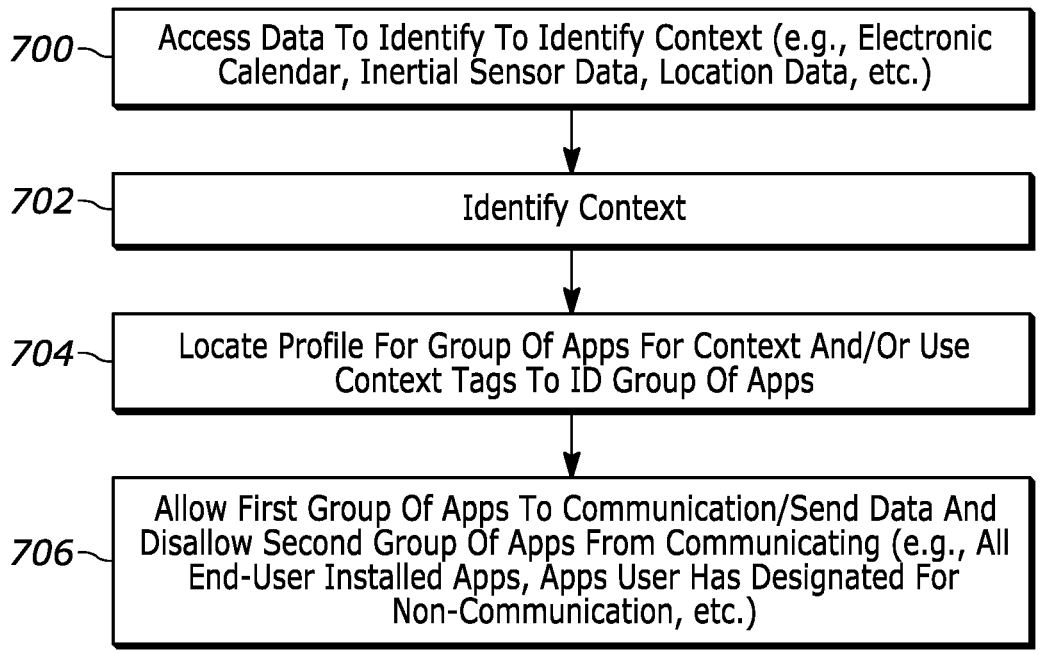
FIG. 7 illustrates example logic in example flow chart format that may be executed by a device consistent with present principles.

Continuing the detailed description in reference to FIG. 7, it shows example logic consistent with present principles that may be executed by a device such as the system 100, a client device such as a smartphone, and/or a remotely-located server in any appropriate combination. Note that while the logic of FIG. 7 is shown in flow chart format, other suitable logic may also be used.

Beginning at block 700, the device may access data to, at block 702, identify one or more contexts associated with the client device. For example, the context may be a particular activity identified based on location data accessible to the first device, such as GPS coordinates identified by the client device's GPS transceiver to then infer an activity based on current location. E.g., if the GPS coordinates indicate the user/client device is at a known location of a gym or alpine ski area, the activity of physical exercise may be inferred. Or if the GPS coordinates indicate that the user is at a store, the activity of shopping may be inferred.

As another example, the context may be identified based on a current time of day and/or electronic calendar data accessible to the device. E.g., any weekday time between 5:00 p.m. local on one day and 8:00 a.m. local on the next consecutive weekday day may be inferred as a personal context (as may all times on Saturday and Sunday), while weekday times between 8:00 a.m. and 5:00 p.m. local may be inferred as a business context. Additionally or alternatively, the current time of day may be compared against data in an end-user's personal electronic calendar to identify an activity noted in a calendar entry that covers the current time of day, and then that activity from the calendar may be correlated to a certain context based on keyword recognition and/or based on the context itself being indicated in the calendar entry (e.g., the calendar entry says "workout", "gym", or even "business meeting").

Still further, in addition to or in lieu of the foregoing, the context may be identified based on input from one or more inertial sensors, such as one or more gyroscopes or accelerometers. A certain context may then be inferred from the sensor input based on predefined movement patterns indicated via the inertial sensor data. For example, walking may be inferred based on a predefined walking movement pattern, running/physical exercise may be inferred based on a predefined running or rigorous exercise movement pattern, driving a motor vehicle may be inferred based on the device traveling at a speed above a threshold amount (e.g., five miles per hour), etc.

As yet another example, the context may be identified based on data from a wireless cellular transceiver, such as receipt of a communication from the client device's cellular service provider indicating that the client device is within a threshold of a data consumption limit for a particular period of time, such as only having ten percent of the client device's total data allotment left for inbound and outbound communications for the current monthly billing cycle. Additionally or alternatively, the client device may access its own data tracker (e.g., as maintained by an app downloaded from the cellular service provider themselves) to determine whether the client device is within the threshold. In either case, here a data saver context may be inferred to limit data consumption by various apps stored at the client device.

As another example for identifying a context based on data from a wireless cellular transceiver, the context may also be identified by scanning incoming text or email messages (received through the transceiver) using natural language processing to identify the context from the incoming message(s).

As still another example, the device may access a device/app usage history as stored at the client device itself (or elsewhere) to determine whether one or more apps have been invoked/launched by the end-user a threshold number of times (e.g., five times) at a specific location and/or time of day (respectively identified via GPS coordinates or a clock app, for example). The device may then infer a new context based on that and create/establish a corresponding group of apps that have all been launched the threshold number of times at the location and/or time of day. Thus, in the future while the client device is at the same location or during the same time of day, the device may allow those same apps to communicate inbound and outbound with other devices while disallowing other end-user installed apps that have not been invoked the threshold number of times in those same circumstances from being able to communicate.

Still in reference to FIG. 7, note that from block 702 the logic may proceed to block 704 where the device may identify a first group of apps associated with whatever context(s) are identified at block 702. For example, if it has not already done so yet, the device may locate an app profile for the identified context that the device may have already created autonomously, that was created by a developer or device manufacturer, or that the end-user has created by preselecting certain apps for the identified context. The device may then identify a first group of apps from the profile as being authorized to communicate while the context is ongoing/occurring, and also identify a second group of apps from the profile as not being authorized to communicate while the context is ongoing.

Additionally or alternatively, if no corresponding profile has been established already, at block 704 the device may establish a new context profile or simply identify apps to allow to communicate as part of the first group based on one or more context tags that one or more of the locally-stored apps have already been tagged with. Thus, the context tags themselves may indicate one or more contexts that have been associated with the respective app. The context tags may have already been assigned or preestablished by the client device's manufacturer, an app store manager, the developer of the respective app itself, or even an end-user, and may be indicated in app metadata to which the client device has access (e.g., stored locally with the app itself, or stored at a remote storage location). The context tags might be, for example, "physical activity" and "walking" for a fitness tracker app, "driving" and "traveling" for a maps app, "business" and "weekday business hours" for an email app, etc.

Thus, at block 706 based on the associated context that was identified, the device may then allow the first group of apps to communicate with other devices (e.g., transmit outbound data and receive inbound data) using the client device's wireless communication transceiver(s)), while also disallowing the second group of apps from communicating with other devices through the wireless communication transceiver(s). The second group of apps may thus include, for example, all apps the end-user or another person has already designated for non-communication for the identified context, all end-user-installed applications stored at the client device that are not already included in the first group of apps from the associated profile, and/or all apps that do not have a context tag matching the current context.

Additionally or alternatively, the second group of apps may be composed of a threshold number of applications (e.g., top ten apps) that consume the most data through communication with other devices (among all locally-stored apps), and/or any and all apps that consume at least a threshold amount of data within a threshold period of time through communication with other devices. These thresholds may be established by the end-user, an app developer, the client device's manufacturer, etc.

Or as another example, at block 706 for the second group, the device may disallow all apps from communicating for which notifications were presented during the identified context in the past but where the user did not launch/access the app itself in response to the notification (e.g., by selecting the notification itself). For example, if an email notification that an email has been received is presented on the client device's display during an identified context, but the user does not select the notification from the display to present the email itself, the device may determine that the email app should be disallowed from communicating with other devices during the same identified context in the future. As another example, if a social media notification is presented that the end-user has been tagged in a photo or that a direct message has been received, but the user does not launch the social networking app within a threshold time of the notification being presented (e.g., within ten minutes), the device may determine that the social networking app should be disallowed from communicating with other devices during the same identified context in the future. As but one more example, regardless of notification type or app type, if the user dismissed the notification from continuing to be presented on the client device's display (e.g., swipes the notification to the right and off the display), the device may determine that this app should be disallowed from communicating with other devices during the same identified context in the future since the user has dismissed its notification rather than further interacted with the app itself.

Figure 8:
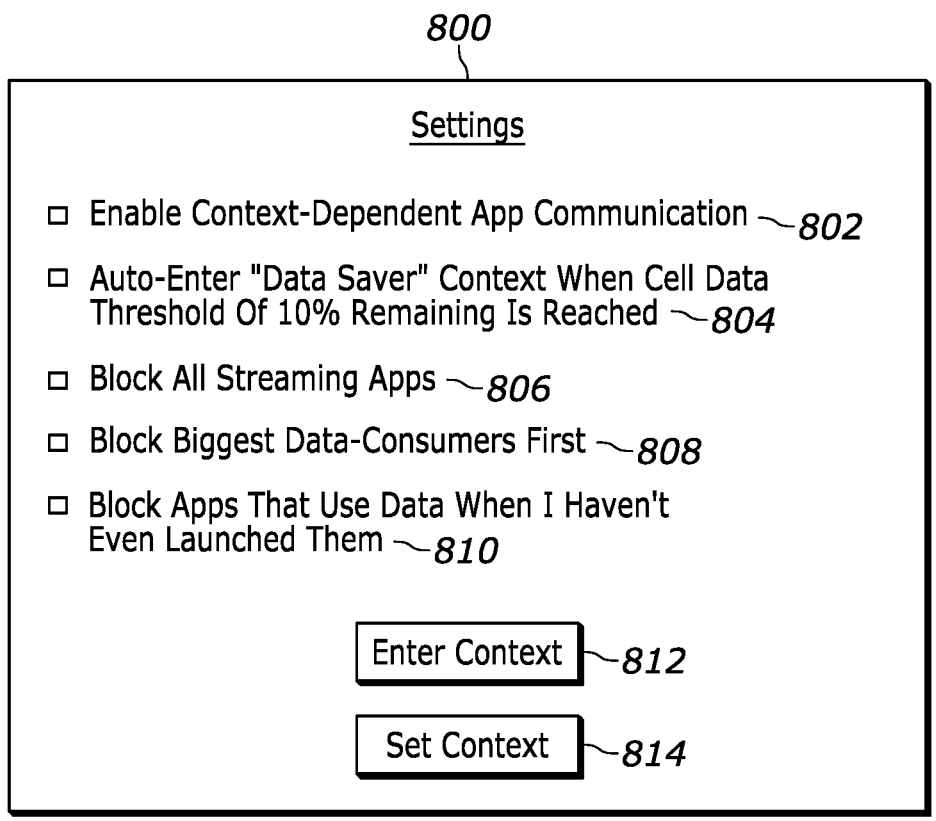
FIG. 8 shows an example GUI that may be presented to configure one or more settings of a device to operate consistent with present principles.

Turning now to FIG. 8, it shows an example GUI 800 that may be presented on a display of a client device, or even the display of a server, to configure one or more settings of a client device or dedicated communication management software application to operate consistent with present principles. For example, the GUI 800 may be presented on a display of the device undertaking the logic of FIG. 7. The settings GUI 800 may be presented to set or enable one or more settings of the device to operate consistent with present principles. It may be reached by, for example, navigating an app menu for the dedicated communication management app or a settings menu of the client device's operating system consistent with present principles. Also note that in the example shown, each option discussed below may be selected by directing touch or cursor input to the respective check box adjacent to the respective option.

Accordingly, as shown in FIG. 8, the GUI 800 may include an option 802 that may be selectable a single time to set or configure the device, system, software, etc. to undertake present principles in the future. For example, the option 802 may be selected to enable context-dependent app communication for multiple future contexts/instances (e.g., by enabling the device or app to execute the logic of FIG. 7 for multiple different contexts in the future).

The GUI 800 may also include an option 804 that may be selectable to configure the client device to autonomously enter a data saver context whenever the client device reaches its threshold level from the relevant cellular data consumption limit for a particular period of time as already described above.

Also if desired, the GUI 800 may include an option 806 to command the client device to block/disallow all content streaming apps from communicating with other devices unless specifically authorized to do so for a particular context that is identified as occurring. These apps may include, for example, music streaming apps for streaming audio in real time from a remotely-located server and video streaming apps for streaming audio video content in real time from a remotely-located server.

Still further, the GUI 800 may include an option 808 that may be selectable to, for a given context, block/disallow certain apps from communicating during the context based on those apps consuming the most data during that context (but still not being designated as allowed to communicate during that context) from amongst all end-user-installed or downloaded apps stored at the client device. Thus, a threshold number of the top data-consuming apps may be blocked, for example, such as the top five apps or top ten apps.

The GUI 800 of FIG. 8 may further include an option 810 that may be selectable to, for an identified context, block all other apps that are communicating or at least attempting to communicate when the end-user has not provided specific input to launch or execute those apps (where those other apps are also not already in the first group for which communication has been authorized). For example, certain apps might transmit and receive data in the background even if they haven't been launched by the end-user or even if the end-user is not actively using the app themselves, and so those apps may be blocked from communicating during the identified context. Then if the user begins using the app during the identified context, communication may subsequently be allowed.

As also shown in FIG. 8, the GUI 800 may also include a selector 812 that may be selectable for the end-user to specify a context as currently ongoing for the device to in turn permit a first group of apps to communicate and disallow a second group of apps from communicating. For example, selection of the selector 812 may command the device to present a GUI like the GUI 400.

The GUI 800 may further include a selector 814. The selector 814 may be selectable to command the device to set, change, or define a new context and associate various apps with that context for communication or non-communication. For example, selection of the selector 814 may command the device to present a GUI like the GUIs 500 and 600.

It may now be appreciated that the above sets forth categorization of apps based on usage history and other criteria. Heuristic learning methods may even be executed by the devices disclosed herein for untagged apps and/or for user-specific behavior to infer that if "A" happens during an identified context, then "B" apps should be allowed to communicate and "C" apps should be disallowed from communicating. The app groupings may be set at the operating-system level or even using a third party communication management application, where the device's processor or even the third party application itself may control the other apps and/or the device's network interface to allow or disallow communication between the various local apps and other devices as appropriate.

Also note consistent with present principles that for apps that are disallowed from communicating during a given context, in certain examples the apps may also be disallowed from presenting any notifications from the app while the context continues. For example, a calendar app may be disallowed from communicating with a calendar server but might still have local data stored at the client device instigating it to provide a certain reminder notification at a certain time of day. But since this app has been disallowed from communicating during the relevant context, the app may also be prevented from presenting that reminder notification as it otherwise might since the context is still ongoing.

Furthermore, note that for applications that do not consume cellular data or at least are not consuming it during a current context that is identified (such as local-only apps, voice call apps, etc.), those apps may be permitted to continue executing in the background during the current context and/or based on user launch during the current context.

What's more, also note that various contexts may be identified still other ways, such as through voice input received at a microphone on the client device on which natural language processing and/or contextual analysis may then be executed to determine a topic or context from the voice input. For example, topic segmentation may be executed on the voice input to identify a topic as being business-related or personal-related, which in turn may cause the device to respectively infer a business or personal context.

Likewise, object recognition, computer vision, and other image processing software may be executed on images from a camera on the client device to infer a context that is currently ongoing from the images (e.g., an office room may be identified from which the device may infer a business context, or a store shelf may be identified from which the device may infer a shopping context).

It may now be appreciated that present principles provide for an improved computer-based user interface that increases the functionality and ease of use of the devices disclosed herein while also saving on network resources, data consumption and bandwidth, battery power, occupied RAM, and processor resources through selective app communication management based on context. The disclosed concepts are thus rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A first device, comprising:
at least one processor; and
storage accessible to the at least one processor and comprising instructions executable by the at least one processor to:
identify a context as currently ongoing;
identify a first group of applications (apps) associated with the context;
responsive to identifying the context as currently ongoing, present a graphical user interface (GUI) on a display, the GUI indicating the context that is currently ongoing, the GUI comprising a prompt for a user to select one or more first apps to include in the first group of apps and to select one or more second apps to include in a second group of apps, the first group of apps being apps that are allowed to communicate with one or more other devices while the context is currently ongoing, the second group of apps being apps that are disallowed from communicating with one or more other devices while the context is currently ongoing, the GUI comprising respective first options selectable to include respective apps in the first group and comprising respective second options selectable to include respective apps in the second group of apps; and
while the context is ongoing, allow the first group of apps as selected via the GUI to communicate with one or more other devices besides the first device and disallow the second group of apps as selected from the GUI from communicating with one or more other devices besides the first device.

2. The first device of claim 1, comprising a wireless communication transceiver accessible to the at least one processor, wherein the first device uses the wireless communication transceiver to allow the first group of apps to communicate with one or more other devices besides the first device.

3. The first device of claim 1, wherein the GUI is a first GUI, and wherein the instructions are executable to:
responsive to a user command, present a second GUI on the display, the second GUI being different from the first GUI, the second GUI comprising respective options to select respective contexts to apply as the context that is currently ongoing.

4. The first device of claim 3, wherein the second GUI comprises a prompt for the user to select from among the respective contexts to apply.

5. The first device of claim 1, wherein disallowing the second group of apps from communicating with one or more other devices comprises disabling or blocking outbound communication commands from a respective app of the second group of apps from being executed by the processor.

6. The first device of claim 1, wherein disallowing the second group of apps from communicating with one or more other devices comprises blocking or declining to provide incoming communications to a respective app of the second group of apps for processing.

7. The first device of claim 1, wherein the GUI comprises, for the first group of apps, a threshold number of apps, the threshold number of apps being less than all end-user installed apps installed at the first device.

8. The first device of claim 7, wherein the threshold number of apps comprises one or more of: most-used apps, most-executed apps.

9. The first device of claim 1, wherein a name for the context is defined based on receipt of user input entering the name to the first device using a keyboard.

10. The first device of claim 1, wherein the first group of apps comprises system apps and operating system-level apps, and wherein the second group of apps comprises all apps downloaded from an app store.

11. The first device of claim 1, wherein the GUI is a first GUI, and wherein the instructions are executable to:
present a second GUI on the display, the second GUI being different from the first GUI, the second GUI being an app menu GUI for a particular software app, the second GUI comprising respective options associated with respective different contexts, each respective option from the second GUI being selectable to permit the particular software app to communicate with other devices while the respective context associated with the respective option from the second GUI is ongoing.

12. The first device of claim 11, wherein the second GUI comprises a prompt that prompts the user to select one or more contexts for which the particular software app should be allowed to communicate with other devices.

13. The first device of claim 1, wherein the context is identified from a personal electronic calendar of the user, the personal electronic calendar used to identify an activity noted in a calendar entry of the electronic calendar, the activity being correlated to the context that is currently ongoing.

14. The first device of claim 1, wherein the context is identified by scanning one or more incoming messages using natural language processing to identify the context from the one or more incoming message, the one or more incoming messages comprising: one or more text messages and/or one or more email messages.

15. The first device of claim 1, wherein a particular app is identified by the first device for inclusion in the second group of apps based the particular app presenting a notification at the first device while the context was ongoing in the past but where the user did not access the particular app itself by selecting the notification while the context was ongoing in the past.

16. The first device of claim 1, wherein a particular app is identified by the first device for inclusion in the second group of apps based the particular app presenting a notification at the first device while the context was ongoing in the past but where the user dismissed the notification from continuing to be presented while the context was ongoing in the past.

17. The first device of claim 1, wherein the instructions are executable to:
present a second GUI on the display, the second GUI being different from the first GUI, the second GUI establishing a settings menu of the first device's operating system, the second GUI comprising an option that is selectable to set the first device to identify multiple respective contexts in the future and to allow or disallow various apps from communicating with other devices while a respective context is ongoing in the future.

18. The first device of claim 1, wherein the instructions are executable to:
while the context is ongoing, also disallow the second group of apps from presenting notifications while the context continues.

19. A method, comprising:
identifying, at a first device, a context as currently ongoing;
identifying a first group of applications (a p associated with the context;
responsive to identifying the context as currently ongoing, presenting a graphical user interface (GUI) on a display, the GUI comprising a prompt for a user to select one or more first apps to include in the first group of apps, the first group of apps being apps that are allowed to communicate with one or more other devices while the context is currently ongoing, the first group of apps being different from a second group of apps that are disallowed from communicating with one or more other devices while the context is currently ongoing, the GUI comprising respective options selectable to include respective apps in the first group; and
while the context is ongoing, using the first device to permit the first group of apps as selected via the GUI to communicate with one or more other devices besides the first device and disallowing the second group of apps from communicating with one or more other devices.

20. At least one computer readable storage medium (CRSM) that is not a transitory signal, the at least one computer readable storage medium comprising instructions executable by at least one processor to:
access first data;
identify, at a first device and based on the first data, a first group of applications (apps) that is allowed to transmit second data to one or more other devices while a given context is currently ongoing;
based on identification of the first group of applications, present a graphical user interface (GUI) on a display, the GUI indicating that a user is to select one or more first apps to include in the first group of apps, the first group of apps being different from a second group of apps that are disallowed from communicating with one or more other devices while the given context is currently ongoing, the GUI comprising respective options selectable to include respective apps in the first group; and
allow, while the given context is currently ongoing, the first group of apps to transmit the second data to one or more other devices and disallow at least one other app in the second group from transmitting third data to one or more other devices.

* * * * *